Patented June 30, 1931

1,812,561

UNITED STATES PATENT OFFICE

WALTER SCHOELLER, OF BERLIN-CHARLOTTENBURG, HANS JORDAN, OF BERLIN-STEGLITZ, AND REINHARD CLERC, OF BERLIN, GERMANY, ASSIGNORS TO THE FIRM SCHERING-KAHLBAUM A. G., OF BERLIN, GERMANY

METHOD OF PRODUCING THYMOL

No Drawing. Application filed November 22, 1928, Serial No. 321,266, and in Germany November 24, 1927.

Our invention refers to the production of thymol and has for one of its objects a method whereby thymol can be produced from hydroxythymol, a compound first described by Fries and Fickewirth in Annalen der Chemie, vol. 362, page 40, as having the constitution

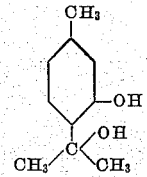

and, on being heated, being converted, by the splitting off of water, into 3-methyl-6-isopropylenphenol.

We have now found that if the heating operation accompanied by the splitting off of water is carried through in the presence of hydrogen and of one of the well known hydrogenation catalysts, the non-saturated side-chain will be saturated with the aid of catalytically combined hydrogen. When 2 atoms hydrogen have entered the molecule, thymol is obtained.

We have found that it is advantageous to use, besides the hydrogenation catalyst, a surface catalyst, i. e. a substance of great porosity and correspondingly large surface, for instance fuller's earth, silica, franconite, diatomite, kieselguhr and the like. We have further found that the catalytically active metal or metals can be deposited with advantage on such a surface catalyst.

The process according to the present invention can also be carried through in the presence of a solvent and/or under elevated pressure, as usual in hydrogenation processes.

Example 1

Hydroxythymol is treated in an autoclave at about 120–170° C. with hydrogen in the presence of 3–5 per cent by weight of a nickel catalyst of the kind adapted for use in hydrogenation, until 2 atoms hydrogen have entered the molecule, whereby thymol is obtained.

Example 2

Hydroxythymol is dissolved in an equal quantity of methane and the solution is treated as described with reference to Example 1, whereby the hydroxythymol is quantitatively converted into thymol which is freed from the solvent by distillation.

Example 3

Hydroxythymol is exposed in the presence of 3–5 per cent by weight of a hydrogenation catalyst and 5–10 per cent of a surface catalyst, for instance franconite, in an autoclave at elevated temperature to the action of hydrogen, until 2 atoms hydrogen have entered into combination. The resulting product is thymol.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. The method of producing thymol comprising acting with hydrogen at 120–170° C. in the presence of a hydrogenation catalyst on hydroxythymol, until 2 atoms hydrogen have been combined.

2. The method of producing thymol comprising acting with hydrogen at 120–170° C. in the presence of a solvent and a hydrogenation catalyst on hydroxythymol, until 2 atoms hydrogen have been combined.

3. The method of producing thymol comprising acting with hydrogen at 120–170° C. and under a pressure above normal in the presence of a hydrogenation catalyst on hydroxythymol, until 2 atoms hydrogen have been combined.

4. The method of producing thymol comprising acting with hydrogen at 120–170° C. in the presence of a hydrogenation catalyst and a substance of great porosity and correspondingly large surface on hydroxythymol, until 2 atoms hydrogen have been combined.

5. The method of producing thymol comprising acting with hydrogen at 120–170° C. in the presence of a hydrogenation catalyst, deposited on a substance of great porosity and correspondingly large surface, on hydroxythymol, until 2 atoms hydrogen have been combined.

In testimony whereof we affix our signatures.

WALTER SCHOELLER.
HANS JORDAN.
REINHARD CLERC.